United States Patent [19]
Priesemuth

[11] Patent Number: 5,174,643
[45] Date of Patent: Dec. 29, 1992

[54] ELECTRIC LIGHT SWITCHING ARRANGEMENT FOR ILLUMINATING THE INTERIOR OF A MOTOR VEHICLE

[76] Inventor: Wolfgang Priesemuth, Postkamp 13, 2210 Itzehoe.-Nordoe, Fed. Rep. of Germany

[21] Appl. No.: 889,786

[22] Filed: May 27, 1992

Related U.S. Application Data

[60] Division of Ser. No. 769,325, Sep. 30, 1991, Pat. No. 5,130,901, which is a continuation-in-part of Ser. No. 349,712, May 10, 1989, abandoned.

[30] Foreign Application Priority Data

May 18, 1988 [DE] Fed. Rep. of Germany ....... 3816908
Jun. 21, 1988 [DE] Fed. Rep. of Germany ....... 3820829

[51] Int. Cl.⁵ .......................... F21Y 23/04; B60Q 3/00
[52] U.S. Cl. ........................................ 362/61; 362/74; 362/276; 362/802; 315/84
[58] Field of Search ..................... 362/61, 74, 80, 276, 362/295, 394, 802; 315/84, 159, 363

[56] References Cited

U.S. PATENT DOCUMENTS

| | | | |
|---|---|---|---|
| 3,221,211 | 11/1965 | Murphy et al. | 315/84 |
| 4,403,172 | 9/1983 | Sasaki et al. | 315/84 |
| 4,473,871 | 9/1984 | Fuchshuber | 362/802 |
| 4,517,469 | 5/1985 | Bier | 315/84 |
| 4,866,345 | 9/1989 | Kataoka | 315/84 |

Primary Examiner—Richard R. Cole
Attorney, Agent, or Firm—Robert W. Becker & Associates

[57] ABSTRACT

An electric light, especially for illuminating the interior of a motor vehicle. The light includes a sensor that is at least electrically connected with the light and that, without a switch, senses the opening of at least one door that leads to the interior of the vehicle. After the opening of the door has been detected, a signal is delivered to a switching mechanism that turns on the electric light for a predetermined and possibly selectable period of time.

9 Claims, 1 Drawing Sheet

ELECTRIC LIGHT SWITCHING ARRANGEMENT FOR ILLUMINATING THE INTERIOR OF A MOTOR VEHICLE

This is a divisional application of application Ser. No. 769,325 filed Sep. 30, 1991, now U.S. Pat. No. 5,130,901 which in turn is a continuation-in-part application of Ser. No. 349,712 filed May 10, 1989, now abandoned.

BACKGROUND OF THE INVENTION

The present invention relates to an electric light switching arrangement, especially for illuminating the interior of a motor vehicle.

Lights for illuminating the interior of a motor vehicle are usually activated by so-called door contact switches, and in particular generally when the vehicle door is opened. The activation of the light via the illumination of the interior is terminated when the door is again closed, for example after a person leaves the interior of the vehicle or after the person has entered the interior of the vehicle. The heretofore known manner of activating the interior light, as well as the door contact switch normally used for this purpose, have several drawbacks. On the one hand, for example when a person has taken his seat within the interior of the vehicle, the light is switched off after the door has been closed because normally the door switch is again shut off. On the other hand, to date door contact switches represent a mechanically and functionally problematic component for use in motor vehicles. One reason for this is that the door contact switch must be installed in a region of the door opening of a motor vehicle that requires great tolerance precision during manufacture, so that during installation the door contact switch must either be precisely adjusted, or door contact switches must be provided that have an extremely long stroke in order to surmount the large variations in dimension. See, for example, U.S. Pat. No. 4,473,871, Fuchshuber.

As previously mentioned, most electric lights of this type have the drawback that just when a person has opened the door in darkness, taken his seat within the vehicle, and has closed the door, the light is again automatically switched off by the door switch and no light is available, for example, for insertion of the ignition key into the ignition. For this purpose, up to now it has then been necessary to illuminate the interior of the vehicle with the electric light via a second switch that is separate from the door contact switch; subsequently, in order to again turn off the light, this parallel switch must be switched off.

It is therefore an object of the present invention to provide an electric light that requires no separate door contact switch for turning the light on, that can be installed with simple means and can be manufactured in an economical manner, and that makes it possible for light to be available to a person that has entered the vehicle, at least long enough to undertake the necessary steps for starting the vehicle.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
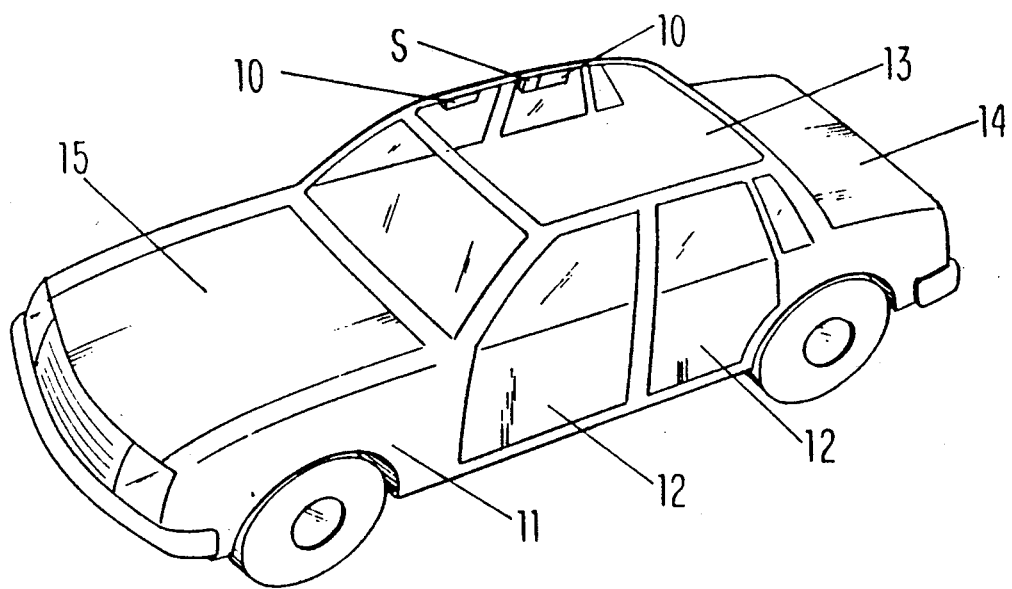
FIG. 1 is a perspective and partially broken away view illustrating one exemplary embodiment of the inventive arrangement in which the sensor is located in the vicinity of the light.
Figure 2:
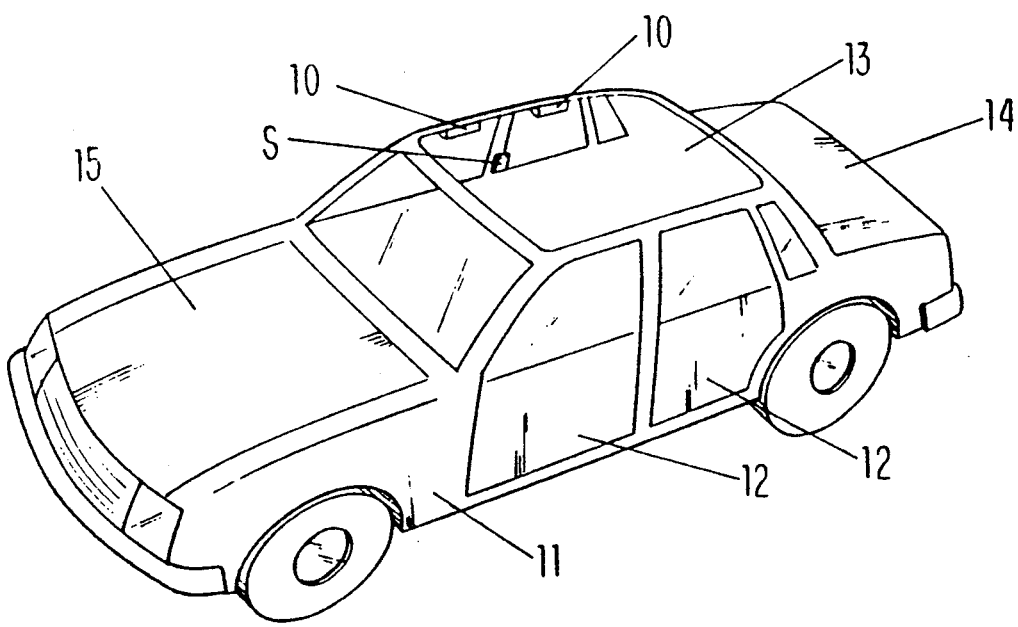
FIG. 2 is a view similar to FIG. 1 illustrating a further exemplary embodiment of the inventive arrangement in which the sensor is located elsewhere in the vehicle.
Figure 3:
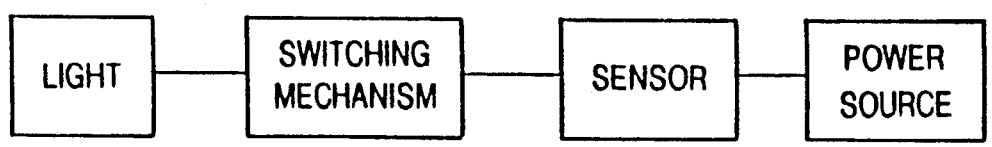
FIG. 3 is a block diagram showing how the inventive arrangement operates.

The electric light of the present invention is characterized primarily by a sensor that is at least electrically connected with the light and that, without a mechanical switch activated by the vehicle doors themselves, senses or detects at least the opening of at least one door that leads to the interior of the vehicle and subsequently delivers a signal to a switching mechanism that then turns on the electric light for a predetermined and possibly selectable period of time.

The advantage of the inventive light is essentially that the previously customary complicated door contact switch can be eliminated, which also has a further advantage, namely the elimination of a separate cost for assembly and installation. The switched-on illumination after closing of the door for a predetermined period of time has the advantage that, for example, a person utilizing the vehicle has sufficient time to insert his key into the ignition while the interior of the vehicle is illuminated, and to start the vehicle, or such person also has enough time in order during the illuminated state of the interior of the vehicle, for example, to buckle up his seat belt or to insert or remove articles from the glove compartment, etc.

Pursuant to the present invention, it is similarly no longer necessary to separately switch off the electric light, since this light automatically goes off after the prescribed period of time.

Pursuant to one advantageous specific embodiment of the present invention, the switching mechanism includes at least an electrical current pulse relay, the retention time of which can be set in conformity with the desired period of time that the light is to remain switched on. A time control switch via a current pulse relay for the temporary illumination of the vehicle interior after activation by the sensor is a very economical variation for constructing a time delay switch. However, other electronic solutions are also possible in place of the current pulse relay. For example, it is possible to have an integrated switching network that is embodied as a counter switch, or a monostable or single-shot multivibrator (mono-flop) that can be embodied in the form of an integrated switching network or can be formed by individual electronic components.

The sensor for detecting that the door of the vehicle is being opened can be disposed either directly in the electric light, i.e. by simply being a component of the electric light, or can be positioned at some suitable location somewhere in the interior of the vehicle and can then be connected via electric lines to the light. For example, the sensor could be disposed on or in the dashboard, or on some wall or on the roof of the interior of the vehicle. It would also be possible to dispose the sensor somewhere on a door frame.

Pursuant to another specific embodiment of the present invention, the sensor detects, i.e. is responsive to, a change of the ambient pressure relative to the location at which it is secured in the interior of the vehicle. It is known that when the door of the vehicle is opened, and even if the window to the interior of the vehicle is not completely closed, a partial vacuum results, whereas when the door is closed, with the other conditions being the same, an overpressure results. The sensor can be embodied in such a way that it reacts either to a partial vacuum or to an overpressure, or can be set in such a way that it responds in general to a change in pressure.

In this connection, the sensor body is preferably formed by a pressure box that is provided with a suitable membrane or diaphragm that cooperates with a switch, so that when the membrane responds, the switch is closed and the electric light is turned on for a predetermined period of time.

Pursuant to a further advantageous specific embodiment of the present invention, the sensor is formed by a device that is similar to a microphone. This embodiment is particularly suitable where a highly sensitive sensor for detecting the opening or closing of the door is required.

Circumstances are also conceivable where neither a sensor that responds to pressure changes in the interior of a vehicle nor a sensor that responds to noise can be provided, for example if during operation of the motor vehicle significant pressure changes can be expected in the interior of the vehicle or if the noise level in the interior of the vehicle is so great that a microphone-type device could not be used for activating the electric light. Where such problems arise, it can be advantageous to provide in the interior of the vehicle an alternating field that is generated by a transmitter, and the detuning or changing of which, for example due to opening of the door and/or the entry or exit of a person into or out of the interior of the vehicle, is detected by the sensor. In this situation, the sensor is generally part of an electrical or electronic circuitry that generates the alternating field.

The alternating field is preferably a high frequency field, an ultrasonic field, a microwave field, or a UV-radiation field.

Pursuant to a further specific embodiment of the present invention, there is preferably provided in the interior of the vehicle a transmitter for generating ultraviolet radiation, with the sensor detecting a disruption of the ultraviolet radiation at least when the door is opened. The disruption delivers to the switching mechanism a signal that is electronically suitable for switching and that in the manner previously described switches on the electric light for a predetermined period of time.

Further specific features of the present invention will be described in detail subsequently.

DESCRIPTION OF PREFERRED EMBODIMENTS

Referring now to the drawing in detail, disposed in the interior 13 of a motor vehicle 11, which can be a passenger car, a truck, or any other type of motor vehicle, is at least one electric light 10; this light 10 is electrically connected to a sensor. The sensor S can be disposed directly in the electric light, so that no separate sensor components have to be provided, which in turn has the advantage of reducing the manufacturing costs of such a light 10 relative to the manufacturing costs of a separate light and a separate sensor, and of eliminating costs for the installation of the electric lines between the light and a sensor. However, as indicated previously the sensor S could be located within the interior of the vehicle, for example on the dashboard, on the roof of the vehicle interior, or even on a door frame.

When the door 12 is opened, whereby this door can be any door that permits access of a person to the interior of the motor vehicle, the sensor S, depending upon the construction thereof, either detects a partial vacuum or overpressure that results when the door 12 is opened or closed, or detects a noise, in which case the sensor is embodied as a microphone-type device. As a consequence of the detection of the opening of the door, a signal is delivered to a switching mechanism, which can be an electrical, electromechanical, or an electronic switching mechanism. As a result, the switching mechanism turns on the electric light, for illumination of the interior of the motor vehicle, for a predetermined period of time. In principle, this period of time can be of such a short duration that to the person that has entered the interior 13 of the vehicle, it appears as if the illumination of the interior has ceased with the closure of the door 12; in other words, the predetermined period of time could also be set to the short period of time that normally elapses between the opening of a door 12, the seating of a person in the interior 13 of the motor vehicle 11, and the subsequent closing of the door 12.

However, the period of time can also be set in such a way that the light remains switched on for, for example, ten seconds after the door 12 has again been closed after the person has entered the vehicle.

As indicated above, the sensor may be of a type that is responsive to a change of air pressure, i.e. a pressure differential, in the interior of the vehicle as a result of a door being opened or closed. It should be noted that whereas the sensor will detect a change in pressure within the interior of the vehicle due to the opening or closing of a door, the opening or closing of a window will not be sufficient to activate the inventive sensor. For purposes of the present invention, where a pressure-sensitive sensor is used, the opening or closing of a door generates an extremely great pressure differential, whereas the opening or closing of a window has little or no effect upon the pressure within the interior of the vehicle.

It is also possible to provide for a manual switching-on of the electric light 10, in addition to the inventive switching-on, by an additional manual switch or the like that is essentially connected in parallel with the switch arrangement of the present invention.

Furthermore, it is also possible to use the electric light 10, for example, not only for the space available in the motor vehicle for people, but also as a light to illuminate the vehicle trunk 14 or the engine compartment 15, etc., whereby, for example, the light could be switched on when the trunk lid or the hood are opened.

The present invention is, of course, in no way restricted to the specific disclosure of the specification and drawing, but also encompasses any modifications within the scope of the appended claims.

What I claim is:

1. An electric light switching arrangement for illuminating an interior of a motor vehicle, comprising:
    a sensor that is electrically connected to said light, with said sensor sensing an opening of at least one door of said vehicle that leads to said interior thereof and subsequently delivering a signal to a switching mechanism that then turns said light on for a predetermined period of time; and
    a transmitter disposed in said interior of said vehicle for generating an alternating field, wherein said sensor is responsive to a change of said alternating field resulting from said opening of at least one door of said vehicle.

2. An electric light switching arrangement according to claim 1, which includes at least one electrical current pulse relay, a retention time of which can be set in conformity with a desired period of time for said light to be turned on.

3. An electric light switching arrangement according to claim 1, in which said sensor is disposed in an immediate vicinity of said light.

4. An electric light switching arrangement according to claim 1, in which said sensor is disposed in said interior of said vehicle.

5. An electric light switching arrangement according to claim 1, in which said sensor is disposed in a door frame of said vehicle.

6. An electric light switching arrangement according to claim 1, in which said alternating field is a high frequency field.

7. An electric light switching arrangement according to claim 1, in which said alternating field is an ultrasonic field.

8. An electric light switching arrangement according to claim 1, in which said alternating field is an microwave field.

9. An electric light switching arrangement according to claim 1, in which said alternating field is a UV-radiation field.

* * * * *